US008188181B2

(12) United States Patent
Henry

(10) Patent No.: US 8,188,181 B2
(45) Date of Patent: May 29, 2012

(54) PHOTOCHROMIC COMPOSITIONS, RESINS AND ARTICLES OBTAINED THEREFROM

(75) Inventor: David Henry, Morigny-Champigny (FR)

(73) Assignee: Corning Incorporated, Corning, NY (US)

( * ) Notice: Subject to any disclaimer, the term of this patent is extended or adjusted under 35 U.S.C. 154(b) by 214 days.

(21) Appl. No.: 12/564,412

(22) Filed: Sep. 22, 2009

(65) Prior Publication Data

US 2011/0071257 A1    Mar. 24, 2011

(51) Int. Cl.
*C08K 5/15* (2006.01)
(52) U.S. Cl. ...................................................... 524/751
(58) Field of Classification Search .................... 524/751
See application file for complete search history.

(56) References Cited

U.S. PATENT DOCUMENTS

| | | | |
|---|---|---|---|
| 3,562,172 A | 2/1971 | Ono | |
| 3,567,605 A | 3/1971 | Becker | |
| 4,215,010 A | 7/1980 | Hovey | |
| 4,306,780 A | 12/1981 | Tarumi | |
| 4,342,668 A | 8/1982 | Hovey | |
| 4,634,767 A | 1/1987 | Hoelscher | |
| 4,637,968 A | 1/1987 | Grimes | |
| 4,699,473 A | 10/1987 | Chu | |
| 4,719,296 A | 1/1988 | Irie | |
| 4,720,547 A | 1/1988 | Kwak | |
| 4,721,377 A | 1/1988 | Fukuda | |
| 4,756,973 A | 7/1988 | Sakagami | |
| 4,785,097 A | 11/1988 | Kwak | |
| 4,792,224 A | 12/1988 | Kwiatkowski | |
| 4,816,584 A | 3/1989 | Kwak | |
| 4,831,142 A | 5/1989 | Kwak | |
| 4,851,530 A | 7/1989 | Rickwood | |
| 4,889,413 A | 12/1989 | Ormsby et al. | |
| 4,909,963 A | 3/1990 | Kwak | |
| 4,913,544 A | 4/1990 | Rickwood | |
| 4,931,219 A | 6/1990 | Kwiatkowski | |
| 4,931,221 A | 6/1990 | Heller | |
| 4,936,995 A | 6/1990 | Kwiatkowski | |
| 4,980,089 A | 12/1990 | Heller | |
| 4,986,934 A | 1/1991 | Kwiatkowski | |
| 5,066,818 A | 11/1991 | Gemert | |
| 5,106,998 A | 4/1992 | Tanaka | |
| 5,114,621 A | 5/1992 | Guglielmetti | |
| 5,130,058 A | 7/1992 | Tanaka | |
| 5,139,707 A | 8/1992 | Guglielmetti | |
| 5,166,345 A | 11/1992 | Akashi | |
| 5,171,636 A | 12/1992 | Castaldi | |
| 5,180,524 A | 1/1993 | Casilli | |
| 5,200,116 A | 4/1993 | Heller | |
| 5,224,602 A | 7/1993 | Bettles | |
| 5,233,038 A | 8/1993 | Guglielmetti | |
| 5,238,981 A | 8/1993 | Knowles | |
| 5,241,075 A | 8/1993 | Hibino | |
| 5,270,439 A | 12/1993 | Maruyama | |
| 5,384,379 A | 1/1995 | Bader | |
| 5,446,149 A | 8/1995 | Rickwood | |
| 5,763,511 A | 6/1998 | Chan | |
| 5,973,039 A | 10/1999 | Florent et al. | 524/100 |
| 6,221,284 B1 | 4/2001 | Florent et al. | 252/586 |
| 6,222,285 B1 | 4/2001 | Haley | |
| 6,506,538 B1 | 1/2003 | Breyne | |
| 6,733,887 B2 | 5/2004 | Okoroafor | |
| 6,770,707 B2 | 8/2004 | Henry | |
| 7,261,842 B2 | 8/2007 | Henry | |
| 7,473,754 B1 | 1/2009 | Okoroafor | |
| 2005/0092972 A1 | 5/2005 | Chan et al. | 252/586 |
| 2008/0200582 A1 | 8/2008 | Craciun | |

FOREIGN PATENT DOCUMENTS

| | | |
|---|---|---|
| EP | 0171909 | 2/1986 |
| EP | 0232295 | 8/1987 |
| EP | 0508219 | 10/1992 |
| EP | 0562915 | 9/1993 |
| FR | 2738248 | 3/1997 |
| JP | 61072748 | 4/1986 |
| JP | 2001/172255 A | 6/2001 |
| WO | 98/16863 A1 | 4/1998 |

OTHER PUBLICATIONS

PHOTOCHROMISM G. Brown, Editor—Techniques of Chemistry—Wiley Interscience—vol. III—1971—Chapter III—pp. 45-294—R. C. Bertelson. PHOTOCHROMISM—Molecules & Systems—Edited by H. Durr—H. Bouas-Laurent—Elsevier 1990—Chapter 8: Spiropyrans—pp. 314-455—R. Gugliemetti.
Ciba® CA45-0535, Experimental High Refractive Index Dimethacrylate Monomer, Edition: Aug. 2009, Basel, Ciba Inc., created Mar. 8, 2009, pp. 1-2.

*Primary Examiner* — Edward Cain
(74) *Attorney, Agent, or Firm* — Robert P. Santandrea; Dean Y. Shahriari

(57) ABSTRACT

Compositions that include one or more compounds according to formula I:

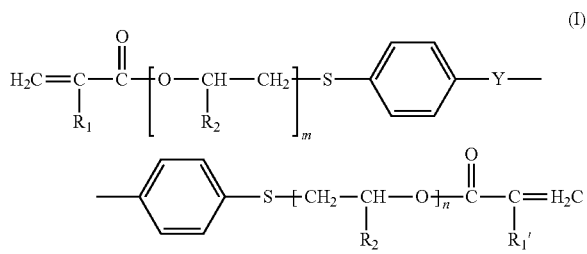

wherein
Y is —S—, or —$SO_2$—;
$R_1$ and $R_1'$ are independently chosen from H, —$CH_3$, or a combination thereof;
$R_2$ is H, —$CH_3$, or,

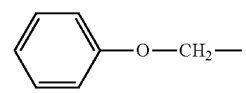

and
m and n are independently chosen from 0, 1, 2, 3, and 4; and one or more photochromic compounds.

34 Claims, No Drawings

PHOTOCHROMIC COMPOSITIONS, RESINS AND ARTICLES OBTAINED THEREFROM

BACKGROUND

Plastic ophthalmic lenses provide several advantages over inorganic glass lenses, including being lightweight and shatterproof. However, plastic lenses often suffer from low refractive indices. Materials with a low refractive index do not allow thin lenses with the necessary degree of correction to be made.

Ophthalmic lenses can also be made to be photochromic, meaning that they can change color in response to changing light conditions. Plastic photochromic lenses also often suffer from relatively low refractive indices. Therefore, there remains a need for new compositions for plastic photochromic lenses that have relatively high refractive indices.

SUMMARY

Disclosed herein are compositions that include one or more compounds according to formula I:

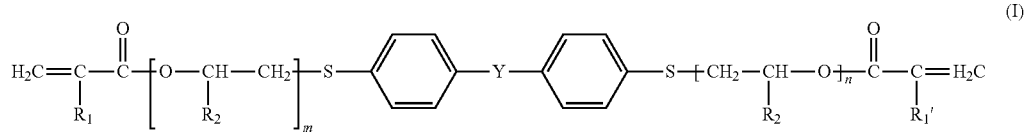

wherein

Y is —S—, or —SO$_2$—;

R$_1$ and R$_1$' are independently chosen from H, —CH$_3$, or a combination thereof;

R$_2$ is H, —CH$_3$, or,

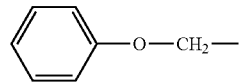

and m and n are independently chosen from 0, 1, 2, 3, and 4; and one or more photochromic compounds.

Also disclosed herein are a resin obtainable by polymerization of a composition that includes one or more compounds according to formula I

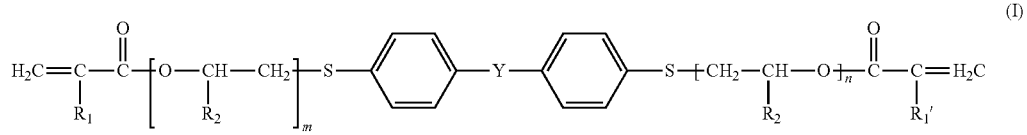

wherein

Y is —S—, or —SO$_2$—;

R$_1$ and R$_1$' are independently chosen from H, —CH$_3$, or a combination thereof;

R$_2$ is H, —CH$_3$, or,

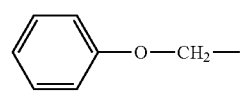

and m and n are independently chosen from 0, 1, 2, 3, and 4; and one or more photochromic compounds.

Also disclosed herein is an article including a resin obtainable by polymerization of a composition that includes: one or more compounds according to formula I

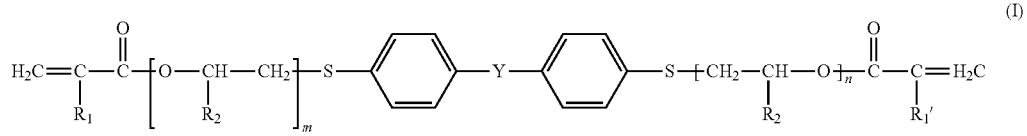

(I)

wherein
Y is —S—, or —SO$_2$—;
R$_1$ and R$_1$' are independently chosen from H, —CH$_3$, or a combination thereof;
R$_2$ is H, —CH$_3$, or,

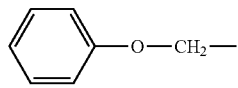

and
m and n are independently chosen from 0, 1, 2, 3, and 4; and one or more photochromic compounds, wherein the article is an ophthalmic article and wherein it has a refractive index of between about 1.59 and 1.61.

DETAILED DESCRIPTION

Embodiments other than those specifically discussed herein are contemplated and may be made without departing from the scope or spirit of the present disclosure. The following detailed description is not limiting. The definitions provided are to facilitate understanding of certain terms frequently used and do not limit the disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification, use of a singular form of a term can encompass embodiments including more than one of such term, unless the content clearly dictates otherwise. For example, the phrase "adding a solvent" encompasses adding one solvent or more than one solvent, unless the content clearly dictates otherwise. As used in this specification and the appended claims, the term "or" is generally employed in its sense including "either or both" unless the context clearly dictates otherwise.

"Include," "including," or like terms means encompassing but not limited to, that is, inclusive and not exclusive.

Disclosed herein are compositions, resins formed from compositions and articles formed from the resins. Disclosed compositions can be referred to as photochromic compositions, resins formed from the compositions can be referred to as photochromic resins, and articles formed from the resins can be referred to as photochromic articles. In embodiments, disclosed articles can be ophthalmic articles and in embodiments, disclosed articles can be ophthalmic lenses.

Disclosed compositions include at least one or more compounds according to formula I:

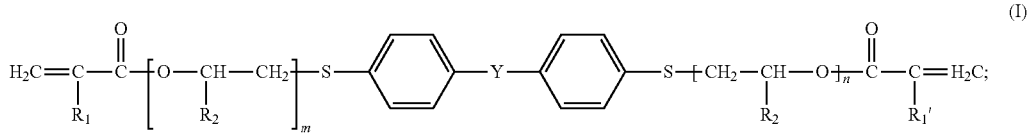

(I)

and one or more photochromic compounds.

Compounds of formula I can be referred to as monomers. The term "monomer" as used herein refers to a compound that may become chemically bonded to other monomers to form a polymer. Formation of the chemical bonds that form a polymer from monomers can also be referred to as polymerization.

It is thought, but not relied upon, that different portions of compounds of formula I provide different properties to compositions that include such compounds. A compound of formula I can be described as having three distinct portions, as seen below. The three portions include those designated by the boxes A, B, and C below.

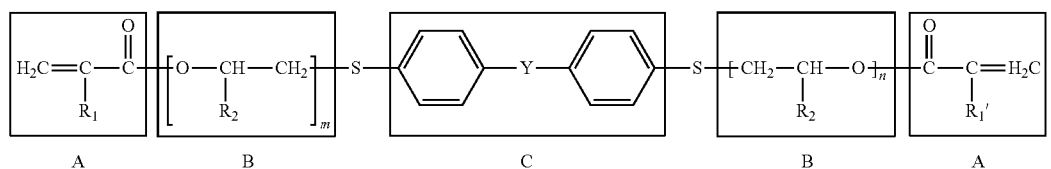

The portion of the compound above designated as A can be referred to as the polymerizable portion. In compounds of formula I, it can either be acryloyl group or a methacryloyl group. The compounds of formula I have two polymerizable portions in order to extend the polymer chain rather than terminating it.

The portion of the compound above designated as B can be referred to as the spacer portion. The spacer portion can either increase or decrease the flexibility of the compound. The flexibility of the compound can be increased by selecting a higher number for m, n, or both m and n; and the flexibility of the compound can be decreased by selecting a lower number for m, n, or both m and n. Increased flexibility can be beneficial in that it can increase the free volume in a polymerized resin of the composition. Increased free volume can function to afford the photochromic compound in the composition an increased volume in which to undergo the conformation change that shifts it from colored to colorless and vice versa. Increased free volume can also function to decrease the mechanical properties of the polymerized product of the composition. In some embodiments, the choice of the length of the spacer portions (the value of m and n) can be a compromise between the advantageous photochromic properties provided by higher values for m and n and the possibly disadvantageous mechanical properties provided by higher values for m and n.

The portion of the compound above designated as C can be referred to as the high refractive index portion of the molecule. The aromatic structure (more specifically, the two phenyl groups) provides the final composition with a relatively high refractive index. This portion of the molecule can also contribute to the relatively high solubility of the photochromic compound in the composition. This effect on the solubility may be due to the π-π interactions between the aromatic parts of the photochromic compound and the aromatic portions of the molecule of formula I. This portion of the molecule can also contribute to the relatively high hardness of the compositions once polymerized. This portion of the molecule can also provide the composition with properties that are amenable to casting the composition.

In embodiments, compositions as disclosed herein can have at least about 30% by weight of a compound of formula I. Compositions having at least about 30% by weight of compounds of formula I will generally provide polymerized compositions having desired properties, for example desired refractive indices. Such exemplary polymer compositions can advantageously have a refractive index of from about 1.55 to about 1.65; from about 1.575 to about 1.625; from about 1.58 to about 1.62; from about 1.59 to about 1.61, or about 1.60.

In formula I, Y can be —S—, or —SO$_2$—. An exemplary set of compounds of formula I is given below in formula Ia:

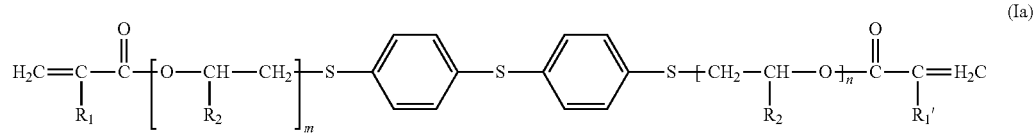
(Ia)

in which $R_1$, $R_1'$, $R_2$, m and n are as defined below. Another exemplary set of compounds of formula I are given below in formula Ib:

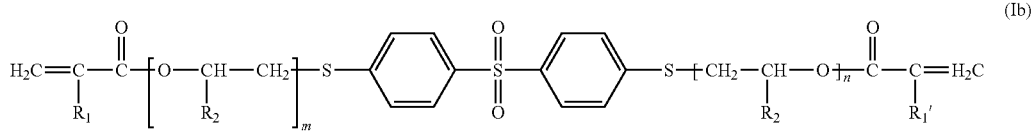
(Ib)

in which $R_1$, $R_1'$, $R_2$, m and n are as defined below. In embodiments, Y can be —$SO_2$—.

In formula I, $R_1$ and $R_1'$ can independently be selected from H, or —$CH_3$. In embodiments, $R_1$ and $R_1'$ can both be —$CH_3$. In formula I, $R_2$ can independently be selected from H, —$CH_3$, or,

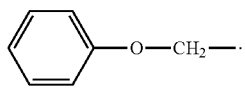

In embodiments, both $R_2$ substituents can be the same. In embodiments, $R_2$ can both be H. In formula I, m and n can independently be selected from 0, 1, 2, 3, and 4. In embodiments, both m and n can be 1.

In embodiments, compositions as disclosed herein can have at least about 40% by weight of a monomer or monomers of formula Ia. Compositions having this amount of formula Ia will generally produce polymerized resins having a refractive index that is acceptable for use in ophthalmic articles, for example, from about 1.55 to about 1.65; from about 1.575 to about 1.625; from about 1.58 to about 1.62; from about 1.59 to about 1.61, or about 1.60. In embodiments, compositions as disclosed herein can have at least 30% by weight of a monomer or monomers of formula Ib. Compositions having this amount of formula IB will generally produce polymerized resins having a refractive index that is acceptable for use in ophthalmic articles, for example, from about 1.55 to about 1.65; from about 1.575 to about 1.625; from about 1.58 to about 1.62; from about 1.59 to about 1.61, or about 1.60.

In an embodiment, the compound given below as formula Ic can be utilized:

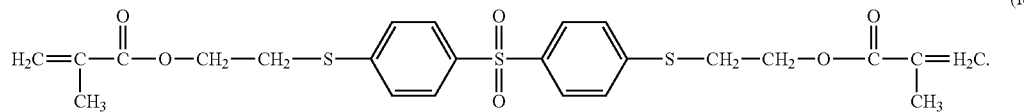

The compound of formula Ic can also be referred to as 4,4'-bis(methacryloyloxyethylthio) diphenylsulfone, or "BMOTDPS". BMOTDPS can be commercially obtained from Ciba Inc. (Basel, Switzerland) under the trade name CA45-0535.

Disclosed compositions also include at least one photochromic compound. Photochromism is the reversible transformation of a chemical compound between two forms by the absorption of electromagnetic radiation, where the two forms have different absorption spectra. The absorption spectra can be different based on an absorption band in the visible part of the spectrum changing in strength or wavelength. Practically, photochromism provides a reversible change of color upon exposure to light.

Photochromic compounds that can be utilized herein include for example triarylmethanes, stilbenes, azastilbenes, nitrones, naphthopyrans, quinones, spiroxazines, spiropyrans, chromenes, fulgides, fulgimides, and combinations thereof. In embodiments, spiroxazines, spiropyrans, chromenes, fulgides, fulgimides, chromenes, or combinations thereof can be utilized in disclosed compositions. Numerous photochromic compounds are commercially available and can be utilized herein.

Spiroxazine photochromic compounds which may be used in disclosed compositions include, for example those found in U.S. Pat. Nos. 3,562,172, 4,634,767, 4,637,968, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345, in the published European patent applications EP-A-0 508 219, 0 232 295 and 0 171 909, and in the French patent application FR-A-2 738 248.

Spiropyran photochromic compounds which may be used in disclosed compositions include, for example those found in: PHOTOCHROMISM G. Brown, Editor—Techniques of Chemistry—Wiley Interscience—Vol. III—1971—Chapter III—Pages 45-294—R. C. Bertelson. PHOTO-CHROMISM—Molecules & Systems—Edited by H. Durr—H. Bouas-Laurent—Elsevier 1990—Chapter 8: Spiropyrans—Pages 314-455—R. Gugliemetti Chromene photochromic compounds which may be used in disclosed compositions include, for example those found in U.S. Pat. Nos. 3,567,605, 4,889,413, 4,931,221, 4,980,089, 5,066,818, 5,106,998, 5,130,058, 5,200,116, 5,224,602, 5,238,981, 5,973,039, 6,506,538, and the published European patent application EP-A-0 562 915.

In embodiments, naphthopyran type chromene photochromic compounds may be used. In embodiments, naphthopyran compounds such as those found in commonly assigned U.S. Pat. No. 6,506,538 may be utilized.

In embodiments, photochromic compounds of formula II can be utilized:

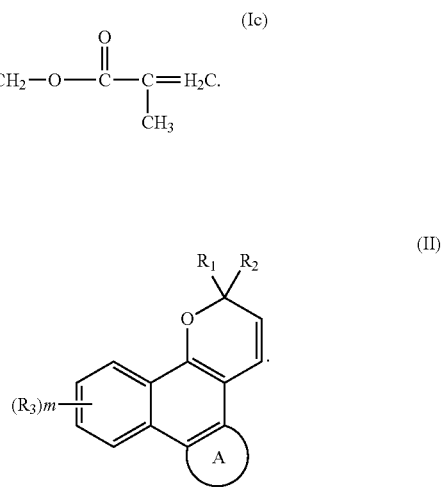

In formula II, $R_1$ and $R_2$ can be independently selected from (a) H, (b) a linear or branched alkyl group having from 1 to 12 carbon atoms, (c) a cycloalkyl group having from 3 to 12 carbon atoms, (d) an aryl or heteroaryl group having in its basic structure 6 to 24 carbon atoms or 4 to 24 carbon atoms, respectively, and at least one heteroatom selected from sulfur, oxygen and nitrogen; said basic structure being optionally substituted with at least one substituent selected from the whole of the substituents given below: (i) a halogen, (in embodiments, fluorine, chlorine or bromine), (ii) a hydroxy group, (iii) a linear or branched alkyl group having from 1 to 12 carbon atoms, (iv) a linear or branched alkoxy group having from 1 to 12 carbon atoms, (v) a haloalkyl or haloalkoxy group corresponding respectively to the $(C_1-C_{12})$ alkyl or alkoxy groups above which are substituted with at least one halogen atom, (in embodiments, a fluoroalkyl group), (vi) a phenoxy or naphthoxy group optionally substituted by at least one linear or branched alkyl or alkoxy group having from 1 to 6 carbon atoms, (vii) a linear or branched alkenyl group having from 2 to 12 carbon atoms (in embodiments a vinyl group or an allyl group), (viii) an —$NH_2$ group, (ix) an —NHR group, with R representing a linear or branched alkyl group having from 1 to 6 carbon atoms, (x) a

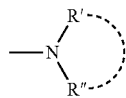

group, with R' and R" independently representing a linear or branched alkyl group having from 1 to 6 carbon atoms, a phenyl group optionally substituted by at least one linear or branched alkyl or alkoxy group having from 1 to 6 carbon atoms, or representing together with the nitrogen atom to which they are bound a 5- to 7-membered ring which can have at least one other heteroatom selected from oxygen, sulfur and nitrogen, said nitrogen being optionally substituted with an R''' group, which is a linear or branched alkyl group having from 1 to 6 carbon atoms, (xi) a methacryloyl group or an acryloyl group, (e) an aralkyl or heteroaralkyl group, the alkyl group, which is linear or branched, having from 1 to 4 carbon atoms, and the aryl and heteroaryl groups having the definitions given above, or (f) said two substituents $R_1$ and $R_2$ together form an adamantyl, norbornyl, fluorenylidene, di($C_1-C_6$)alkylanthracenylidene or spiro($C_5-C_6$)cycloalkylanthracenylidene group; said group being optionally substituted with at least one of the substituents listed above for $R_1$, $R_2$ corresponding to an aryl or heteroaryl group.

In formula II, $R_3$ can independently be selected from (a) a halogen (in embodiments, fluorine, chlorine or bromine), (b) a linear or branched alkyl group having from 1 to 12 carbon atoms (in embodiments, from 1 to 6 carbon atoms), (c) a cycloalkyl group having from 3 to 12 carbon atoms, (d) a linear or branched alkoxy group having from 1 to 12 carbon atoms (in embodiments, from 1 to 6 carbon atoms), (e) a haloalkyl, halocycloalkyl, haloalkoxy group corresponding, respectively, to the alkyl, cycloalkyl, and alkoxy groups above, which are substituted with at least one halogen atom (in embodiments, fluorine, chlorine or bromine), (f) an aryl or heteroaryl group having the same definition as that given above for $R_1$, $R_2$, (g) an aralkyl or heteroaralkyl group, the alkyl group, which is linear or branched, having from 1 to 4 carbon atoms and the aryl and heteroaryl groups having the same definitions as those given above for $R_1$, $R_2$, (h) a phenoxy or naphthoxy group optionally substituted by at least one linear or branched alkyl or alkoxy group having from 1 to 6 carbon atoms, (i) an amine or amide group, for example —$NH_2$, —NHR, —$CONH_2$, —CONHR,

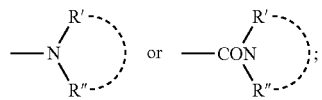

with R, R', R" having their respective definitions given above for the amine substituents of the values $R_1$, $R_2$: aryl or heteroaryl, (j) an —O—$COR_8$ or —$COOR_8$ group, with $R_8$ representing a straight or branched alkyl group having from 1 to 6 carbon atoms or a cycloalkyl group having from 3 to 6 carbon atoms or a phenyl group which is optionally substituted with at least one of the substituents listed above for the values of $R_1$, $R_2$: aryl or heteroaryl; or (k) at least two adjacent $R_3$ groups together forming at least one aromatic or non-aromatic cyclic group having a single ring or two annelated rings, optionally including at least one heteroatom selected from: oxygen, sulfur and nitrogen, this or these annelated rings being optionally substituted with at least one substituent selected from those having the definition given above for the aryl or heteroaryl groups which can form $R_1$ and/or $R_2$.

In formula II, m is an integer from 0 to 4.

In formula II, A represents:

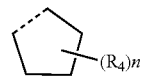

(A₁)

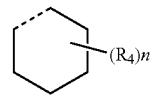

(A₂)

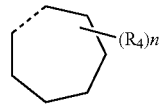

(A₃)

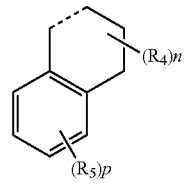

(A₄)

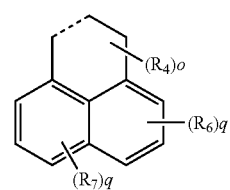

(A₅)

in these annelated rings (($A_1$) to ($A_5$)) the dashed line represents the carbon $C_5$-carbon $C_6$ bond of the naphthopyran ring of formula (II); the α bond of the annelated ring ($A_4$) or ($A_5$) can be linked indifferently to carbon $C_5$ or to carbon $C_6$ of the naphthopyran ring of formula (II); $R_4$, which are identical or different, represent, independently, (a) an OH, (b) an alkyl or alkoxy group which can be linear or branched and which can have from 1 to 6 carbon atoms or two of the $R_4$ form a carbonyl (CO); $R_5$, $R_6$ and $R_7$ represent, independently: (a) a halogen (in embodiments fluorine, chlorine or bromine), (b) a linear or branched alkyl group having from 1 to 12 carbon atoms (in embodiments from 1 to 6 carbon atoms), (c) a haloalkyl group corresponding to the linear or branched above alkyl group, which can be substituted with at least one halogen atom (in embodiments a fluoroalkyl group), (d) a cycloalkyl group having from 3 to 12 carbon atoms, (e) a linear or branched alkoxy group having from 1 to 6 carbon atoms, (f) a phenyl or benzyl group, optionally substituted with at least one of the substituents listed above in the definitions of the radicals $R_1$, $R_2$ of formula (II) in the case in which the radicals independently correspond to an aryl or heteroaryl group, (g) a —$NH_2$, —NHR,

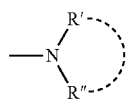

amino group with R, R', R" having their respective definitions given above for the amine substituents of the values $R_1$, $R_2$: aryl or heteroaryl, (h) a phenoxy or naphthoxy group optionally substituted by at least one linear or branched alkyl or alkoxy group having from 1 to 6 carbon atoms, (i) a —$COR_9$, —$COOR_9$ or —$CONHR_9$ group, with $R_9$ representing a linear or branched alkyl group having from 1 to 6 carbon atoms or a cycloalkyl group having from 3 to 6 carbon atoms or a phenyl or benzyl group which is optionally substituted with at least one of the substituents listed above in the definitions of the radicals $R_1$, $R_2$ of formula (II) in the case in which the radicals independently correspond to an aryl or heteroaryl group, or (j) it being possible for two adjacent $R_5$ groups to together form a 5- to 6-membered aromatic or non-aromatic ring which can comprise at least one heteroatom selected from the group comprising: oxygen, sulfur and nitrogen. n is an integer from 0 to 6, o is an integer from 0 to 2, p is an integer from 0 to 4 and q is an integer from 0 to 3; with the condition according to which in ($A_1$) and ($A_2$) n is zero only in the case in which at least two of the adjacent $R_3$ substituents form at least one aromatic or non-aromatic cyclic group having a single ring or two annelated rings, optionally including at least one heteroatom selected from oxygen, sulfur and nitrogen, this or these annelated rings being optionally substituted with at least one substituent selected from those having the definition given above for the aryl groups which can form $R_1$ and/or $R_2$.

In embodiments, the photochromic naphthopyran compound can have formula IIa below:

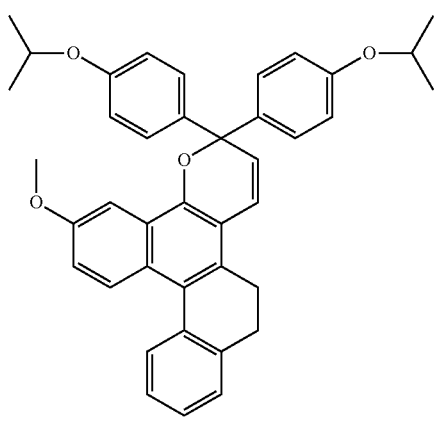

which can be obtained from Corning Inc. (Corning, N.Y.) under the product name CR-173.

It will also be understood that more than one photochromic compound can be used in the same composition. More than one photochromic compound can be utilized in order to obtain a specific tint in the darkened state. In embodiments, photochromic compounds can be included in the composition at a rate of about 0.01% to about 1% by weight with respect to the total weight of the monomers. In embodiments, photochromic compounds can be included in the composition at a rate of about 0.05% to about 0.5% by weight with respect to the total weight of the monomers.

Disclosed compositions can optionally include other monomers as well as that of formula I given above. Other monomers can be added to disclosed compositions in order to effect various properties of the compositions or various properties of resins and/or articles formed from the compositions. Properties that can be affected by monomer addition include, for example, the viscosity of the composition. The viscosity of the composition can affect the ease with which the composition can be processed and manufactured into articles, such as ophthalmic lenses. Mechanical stability of articles, such as ophthalmic lenses can also be affected by monomer addition. Generally, the more crosslinking a composition can undergo, the more mechanically strong an article formed from that composition will be; however excessive crosslinking can cause an article to be brittle.

The refractive index of a resin and/or article formed from a composition can also be affected by monomer addition. In embodiments, it is desired to have the refractive index of the resin and/or article formed from a disclosed composition to be from about 1.55 to about 1.65. In embodiments, it is desired to have the refractive index of the resin and/or article formed from a disclosed composition to be from about 1.575 to about 1.625. In embodiments, it is desired to have the refractive index of the resin and/or article formed from a disclosed composition to be from about 1.58 to about 1.62. In embodiments, it is desired to have the refractive index of the resin and/or article formed from a disclosed composition to be from about 1.59 to about 1.61. In embodiments, it is desired to have the refractive index of the resin and/or article formed from a disclosed composition to be about 1.60.

One type of exemplary monomer that may optionally be included in disclosed compositions is represented by formula III below:

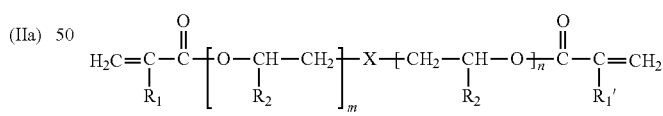

in which X can be selected from:

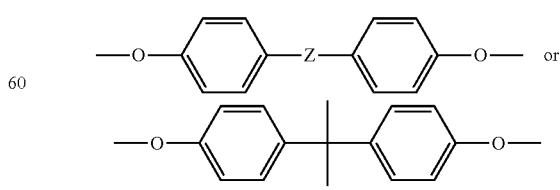

where Z can be selected from —$SO_2$—, —SO—, —S—, —$C(CH_3)_2$—, —$(CH_2)_a$—, wherein a can be 1, 2, 3, or 4; $R_1$ and $R_1$ can independently be chosen from H, and —$CH_3$; and $R_2$ can be H or —$CH_3$; and m and n are integers and are independently selected such that (m+n)=2 to 30.

Addition of compounds according to formula III to disclosed compositions can function to make the composition and, more specifically, a resin formed from the polymerization thereof, more flexible. Addition of compounds according to formula III to disclosed compositions can also function to make the composition and, more specifically, a resin formed from the polymerization thereof, have a decreased refractive index. Compounds of formula III can generally have the effect of decreasing the refractive index even though they contain two phenyl groups (as compared to compounds of formula I) because the ether linkage (C—O—C) decreases the polarizability of the bond when compared with a sulfur atom (which is present in formula I), which tends to decrease the refractive index. Compounds of formula III, where Z is selected from —$SO_2$—, —SO—, or —S will generally render a composition having a higher refractive index than when compounds of formula III with Z selected from —$C(CH_3)_2$—, —$(CH_2)_a$—. Selected monomer(s) of formula III can be added in quantities that will form a resin and/or article having a desired refractive index, for example, a refractive index of from about 1.55 to about 1.65; from about 1.575 to about 1.625; from about 1.58 to about 1.62; from about 1.59 to about 1.61, or about 1.60.

Exemplary compounds of formula III that can be utilized herein include, bisphenol A di(meth)acrylate, bisphenol F di(meth)acrylate, and ethoxylated bisphenol A di(meth)acrylates such as 2,2-bis(methacryloyloxy, propoxylated bisphenol A di(meth)acrylate.

It will also be understood that more than one compound of formula III can be used in the same composition. More than one compound of formula III can be utilized in order to obtain specific properties in the composition, resin or article. In embodiments, a compound(s) of formula III can be included in the composition at a rate of about 0 to about 50 parts by weight with respect to the total weight of the composition. In embodiments, a compound(s) of formula III can be included in the composition at a rate of about 25 to about 40 parts by weight with respect to the total weight of the composition.

Another type of exemplary monomer that may optionally be included in disclosed compositions is represented by formula IV below:

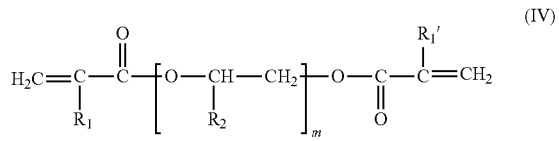

in which $R_1$ and $R_1'$ are independently chosen from H, and —$CH_3$; $R_2$ is H, or —$CH_3$; and m is an integer from 1 to 42. In embodiments, m is an integer from 3 to 42.

Addition of compounds according to formula IV to disclosed compositions can function to make the composition and, more specifically, a resin formed from the polymerization thereof, more flexible. Compounds of formula IV can also function to decrease the refractive index of disclosed compositions and, more specifically, decrease the refractive index of resins formed from disclosed compositions. Compounds of formula IV can function to decrease the refractive index of the composition because there are no "high refractive index" portions of the molecules, such as for example, phenyl groups, bromide atoms, or sulfur containing groups such as thioether sulfides, sulfones, or thiourethanes. Monomers of formula IV can be added in quantities that will form a resin and/or article having a desired refractive index, for example a refractive index of from about 1.55 to about 1.65; from about 1.575 to about 1.625; from about 1.58 to about 1.62; from about 1.59 to about 1.61, or about 1.60.

Exemplary compounds of formula IV that can be utilized herein include, triethylene glycol di(meth)acrylate, tetraethyleneglycol di(meth)acrylate, nonaethyleneglycol di(meth)acrylate, polyethylene glycol di(meth)acrylate, Polypropyleneglycol di(meth)acrylate, polytetramethyleneglycol di(meth)acrylate, and ethylene glycol bisglycidylether methacrylate.

It will also be understood that more than one compound of formula IV can be used in the same composition. More than one compound of formula IV can be utilized in order to obtain specific properties in the composition, resin or article. In embodiments, a compound(s) of formula IV can be included in the composition at a rate of about 0 to about 30 parts by weight with respect to the total weight of the composition. In embodiments, a compound(s) of formula IV can be included in the composition at a rate of about 10 to about 25 parts by weight with respect to the total weight of the composition.

Another type of exemplary monomer that may optionally be included in disclosed compositions is represented by formula V below:

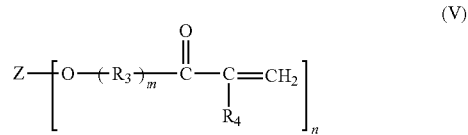

in which $R_3$ is —$CH_2CH(CH_3)O$— or —$CH_2CH_2O$—; $R_4$ is H, or $CH_3$; Z is a monovalent, or polyvalent radical of a polyol; m is 0 or 1; and n is an integer from 1 to 6. In embodiments, n can be an integer from 1 to 4.

Addition of compounds according to formula V to disclosed compositions can function to make the composition and, more specifically, a resin formed from the polymerization thereof mechanically stronger because the compounds of formula V function to crosslink a resin formed from a disclosed composition. Compounds of formula IV can also function to decrease the refractive index of disclosed compositions and, more specifically, decrease the refractive index of resins formed from disclosed compositions. Compounds of formula V can function to decrease the refractive index of the composition because there are no "high refractive index" portions of the molecules, such as for example, phenyl groups, bromide atoms, or sulfur containing groups such as thioether sulfides, sulfones, or thiourethanes. Monomers of formula V can be added in quantities that will form a resin and/or article having a desired refractive index, for example, a refractive index of from about 1.55 to about 1.65; from about 1.575 to about 1.625; from about 1.58 to about 1.62; from about 1.59 to about 1.61, or about 1.60.

Exemplary compounds of formula V that can be utilized herein include, pentaerythritol tri(meth)acrylate, pentaerythritol tetra(meth)acrylate, propoxylated glycerol tri(meth)acrylate, trimethylolpropane tri(meth)acrylate, ethoxylated trimethylolpropane tri(meth)acrylate, tetramethylolmethane tri(meth)acrylate, ethoxylated pentaerythritol tri(meth)acrylate, ethoxylated pentaerythritol tetra(meth)acrylate dipentaerythritol penta/hexa(meth)acrylate, Tris[2-(acryloyloxy) ethyl]isocyanurate, and di(trimethylolpropane)tetraacrylate for example.

It will also be understood that more than one compound of formula V can be used in the same composition. More than one compound of formula V can be utilized in order to obtain specific properties in the composition, resin or article. In embodiments, a compound(s) of formula V can be included in the composition at a rate of about 0 to about 30 parts by weight with respect to the total weight of the composition. In embodiments, a compound(s) of formula V can be included in the composition at a rate of about 5 to about 25 parts by weight with respect to the total weight of the composition.

Another type of exemplary monomer that may optionally be included in disclosed compositions is represented by formula VI below:

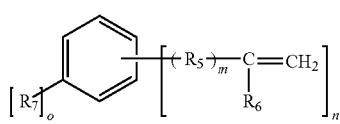

in which $R_7$ is H, $CH_3$, or $-SCH_3$; $R_6$ is $-CH_3$ or H; $R_5$ is $-CH_2OC(=O)-$, or $-CH_2SC(=O)-$; m is 0 or 1; n is 1 or 2; and o is 0, 1, or 2.

Addition of compounds according to formula VI to disclosed compositions can function to make the composition and, more specifically, a resin formed from the polymerization thereof, mechanically stronger, because in instances where $n \geq 2$ the compounds of formula VI function to crosslink a resin formed from a disclosed composition. Compounds of formula VI can be used to decrease the viscosity of a disclosed composition without sacrificing the refractive index of the composition. The refractive index is not decreased substantially because homopolymers prepared from monomers of formula VI generally have refractive indices between about 1.57 and 1.61, which is relatively high. Monomers of formula IV can be added in quantities that will form a resin and/or article having a desired refractive index, for example, a refractive index of from about 1.55 to about 1.65; from about 1.575 to about 1.625; from about 1.58 to about 1.62; from about 1.59 to about 1.61, or about 1.60, a desired crosslink density (and thereby a desired mechanical strength), and desired viscosity of the composition.

Exemplary compounds of formula VI that can be utilized herein include, styrene, divinyl benzene, isopropenyl benzene, diisopropenyl benzene, phenoxyethyl (meth)acrylate, and phenyl (meth)acrylate, for example.

It will also be understood that more than one compound of formula VI can be used in the same composition. More than one compound of formula VI can be utilized in order to obtain specific properties in the composition, resin or article. In embodiments, a compound(s) of formula VI can be included in the composition at a rate of about 0 to about 30 parts by weight with respect to the total weight of the composition. In embodiments, a compound(s) of formula VI can be included in the composition at a rate of about 10 to about 25 parts by weight with respect to the total weight of the composition.

Disclosed compositions can also optionally include other components. Exemplary optional components include, for example, chain transfer agents or polymerization initiators, hindered amine light stabilizers, antioxidants, nucleophillic-compound trapping agents, UV absorbers, and UV filtering agents.

Disclosed compositions can also include chain transfer agents or polymerization initiators. In embodiments, a polymerization initiator that is inert towards the photochromic compound is selected. In embodiments, peroxide-type initiators are not utilized. In embodiments, radical polymerization initiator(s) selected from diazo compounds, peroxyester compounds, or percarbonate compounds can be utilized. These compounds are familiar to the person skilled in the art and are commercially available. Examples of diazo compounds that can be utilized include azobisisobutyronitrile (AIBN) and 2,2'-azobis(2-methylbutyronitrile) (AMBN). Examples of peroxyester compounds that can be utilized include t-butylperoxy-2 ethyl hexanoate, cumylperoxy neodecanoate, t-butylperoxy benzoate, or the like. Examples of percarbonate compounds that can be utilized include diisopropylperoxy dicarbonate, t-butylperoxy dicarbonate, di-2-ethylhexyl peroxy dicarbonate, or the like. The polymerization initiator can generally be used at about 0.01 to 1% by weight with respect to the weight of the monomers present in the composition. In embodiments, the polymerization initiator can be used at about 0.05 to 0.5% by weight, with respect to the weight of the monomers present in the composition. If the amount of polymerization initiator is not sufficient, it can become necessary to carry out the copolymerization at a higher temperature, which can render the reaction difficult to control. If the amount of polymerization initiator is too high, an excess of free radicals may be generated, which can destroy the photochromic compound and cause fatigue in the final material.

Disclosed compositions can also optionally include other components. For example, hindered amine light stabilizers (also referred to as "HALs") can be included in disclosed compositions. In photochromic compositions, HALs can function to increase the resistance to fatigue (to light) of a photochromic composition. Suitable HALs are known to those of skill in the art and are commercially available. Generally, disclosed compositions do not contain more than about 2% by weight of HALs based on the amount of monomers present. In embodiments, disclosed compositions do not contain more than about 0.5% by weight of HALs based on the amount of monomers present.

Disclosed compositions can also optionally include antioxidants. An example of an antioxidant that can be utilized includes for example sterically hindered phenols. Disclosed compositions can also optionally include nucleophilic-compound trapping agents. An example of nucleophilic-compound trapping agents includes for example glycidyl methacrylate. Disclosed compositions can also contain UV absorbers, such as, for example 2-(2H-benzotriazol-2-yl)-4-methyl-phenol (commercially available as TINUVIN® P (Ciba Specialty Chemicals, Basel Switzerland). Disclosed composition can also contain UV filtering agents. Generally, disclosed compositions do not contain more than about 2% by weight of antioxidants, nucleophilic-compound trapping agents, UV absorbers or UV filtering agents based on the amount of monomers present. In embodiments, disclosed compositions do not contain more than about 0.5% by weight of antioxidants, nucleophilic-compound trapping agents, UV absorbers or UV filtering agents based on the amount of monomers present.

Disclosed compositions can be provided as compositions containing the particular components and can be either solid or liquid. Disclosed compositions can be polymerized to form a polymer (or a copolymer depending on the addition of a second or subsequent type of monomer) or a resin. "Polymerized" as used herein refers to at least partially polymerized compositions, substantially polymerized compositions, and fully polymerized compositions. The resin, as formed can form an article, or can be further processed into an article.

Articles formed using disclosed compositions can have advantageous properties. For example, disclosed articles can have relatively high refractive index, in embodiments, of at least about 1.6 or higher. Disclosed articles can also have good photochromic properties. For example, the articles can have high induced optical density, fast fading and darkening kinetics, and low thermal dependence. Disclosed compositions and resins can have good casting ability. The compositions and resins, for example, can be casted without optical distortion. Disclosed articles can have good mechanical properties. For example the articles can have desired levels of hardness.

One exemplary article that can be formed using disclosed compositions includes ophthalmic lenses. Ophthalmic lenses formed using disclosed compositions can offer advantageous properties including, for example, a desired refractive index. Compositions that form manufactured ophthalmic lenses advantageously have a refractive index of from about 1.55 to about 1.65; from about 1.575 to about 1.625; from about 1.58 to about 1.62; from about 1.59 to about 1.61, or about 1.60. Such refractive indices are advantageous because commercially available lens compositions currently in use have such a refractive index, and therefore a novel composition having such a refractive index can be used with limited modifications necessary on the part of lens manufacturers.

The optical and photochromic properties of disclosed resins or articles can also be characterized. An exemplary optical property that can be measured is the yellow index. The yellow index is measured before any exposure of the resin/article to UV light (which would affect the photochromic state change). The yellow index can be determined spectroscopically and visually. A standardized method can be used to determine the yellow index by the spectroscopic method (ASTM D-1925-70). The yellow index $Y_I$ can be defined as follows in Equation (1):

$$Y_i = \frac{(127.5X - 105.8Z)}{Y} \qquad \text{Equation 1}$$

wherein X, Y, and Z are trichromatic coordinates of the sample measured using a UV-visible spectrometer scanning the spectrum from 387 to 780 nm (chromatic coordinates can be calculated according to ASTM method E308-90). In embodiments, a disclosed composition produces a resin and/or article having a yellow index of not greater than about 6. In embodiments, a disclosed composition produces a resin and/or article having a yellow index of not greater than about 5.5. In embodiments, a disclosed composition produces a resin and/or article having a yellow index of not greater than about 5.

Exemplary photochromic properties of resins and/or articles that can be measured are the transmission in the clear state and transmission in the dark state. The amount of transmission in the dark state versus the amount of transmission in the clear state can provide a measure of the extent of the photochromic transition. Transmission in the dark state after various lengths of light exposure can provide a measure of the rate at which the resin/article can affect the photochromic change. Transmission after removing the light exposure can also be measured at various times post light exposure to determine the recovery time of the resin/article. Any one of these properties or a combination of these properties can be measured and utilized to evaluate photochromic resins and/or articles disclosed herein. Specific measurements that can be done and an exemplary method of performing such measurements can be found in the examples that follow herein.

EXAMPLES

Materials and Methods

The following abbreviations are used herein:
BMOTDPS: 4,4'-bis(methacryloyloxyethylthio)diphenylsulfone (can be synthesized according to example 8 of WO 2008/101806)
TBBTDMA: 4,4'-bis(methacryloylthio)-diphenylsulfide (TCI Europe NV, Belgium)
BA(4EO)DMA: Diacryl 121: tetraethoxylated bisphenol A dimethacrylate (Akzo, N.V., Netherlands)
STYR: styrene
DVB: divinyl benzene
PEGDMA 550: polyethylene glycol 550 dimethacylate
TMOPTMA: trimethylol propane trimethacrylate
NDM: N-dodecyl mercaptan
AMBN: 2,2'azobis-(2-methylbutyronitrile)
CR173 (from Corning, Inc. Corning, N.Y.):

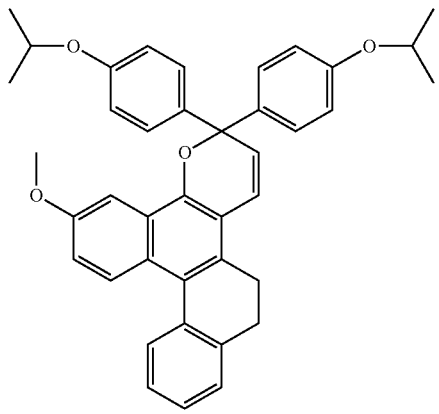

All chemicals were obtained from Sigma-Aldrich, unless indicated otherwise. All monomers and chemicals were used as-is without further purification.
Refractive Index Measurement The refractive index was measured using a standard differential refractometer (Bouty) and a prism made by grinding and polishing the sample of interest.
Yellow Index Measurement The yellow index was measured according to ASTM D-1925-70 using a ZEISS MCS 501 UV-NIR spectrometer (Carl Zeiss Jena GmbH, Jena, Germany) with a wavelength range of 215-1015 nm, 1024 pixels, detector photodiode array, wavelength accuracy <0.3 nm, and wavelength resolution 0.8 nm.
Photochromic Properties Measurement The optical transmission between 190 and 900 nanometers (nm) was measured using a ZEISS MCS 501 UV-NIR spectrometer (Carl Zeiss Jena GmbH, Jena, Germany) for each sample in the light state (TO) and then in the dark state (TD15) after exposure for 15 minutes under a filtered xenon source (distribution near to 60% AM2) at 22° C. The light was then turned off and the transmission was measured after 5 and 60 minutes of fading; which transmission is referred to as TF5, and TF60, respectively. The percentage fading after 5 and 60 minutes, where transmission is referred to as % recF5 and % recF60, respectively, was determined by means of the following expressions: % recF5=100(TF5-TD15); and % recF60=100(TF60-TD15). The data determined thereby allow the fading rate of the photochromic article to be evaluated.

Example 1

BMOTDPS (55 parts by weight) was mixed with 11 parts by weight of DVB, 14 parts by weight STYR, 10 parts by weight TMOPTMA, 10 parts by weight PEGDMA 550 and 0.10 wt % of CR173 with stirring at 50° C. until a homogeneous clear mixture was obtained. The mixture was then cooled to room temperature. Next, 0.26 wt % of AMBN and 0.25 wt % NDM was added to the mixture and stirred. The mixture was polymerized in a lens mold (two glass plates having a 2 mm spacer between them) having a 2 mm thick molding cavity for about 16 hours at about 80° C. The obtained lens was then baked at about 90° C. for about one hour and then for another hour at about 100° C. After cooling, the lenses were removed from the mold. The yellow index, the refractive index of the lens and the photochromic properties were measured as described above. The results are given in Table 1 below.

Example 2

Example 1 was followed except that 0.15 wt % of CR-173 was utilized. The yellow index, the refractive index of the lens and the photochromic properties were measured as described above. The results are given in Table 1 below.

Example 3

Example 1 was followed except that 0.05 wt % of CR-173 was utilized. The yellow index, the refractive index of the lens and the photochromic properties were measured as described above. The results are given in Table 1 below.

Example 4

The composition of Example 1 was prepared and a 15 mm diameter×20 mm length cylinder was prepared by pouring the composition in a siliconized glass mold after sealing. The mold was placed in an oven and the mixture was polymerized using the following program: holding overnight at 53° C., a linear temperature rise over about 2 hours from 53° C. to about 93° C., and holding at 93° C. for about 2 hours. After this cycle, the mold was cooled to room temperature and the solid high refractive index material was removed from the glass mold. The material was checked for defects. No striations were noted and no discoloration was observed in a visual inspection.

Example 5

BMOTDPS (55 parts by weight) was mixed with 10 parts by weight DVB, 5 parts by weight pentaerythritoltriacrylate, 25 parts by weight BA(4EO)DMA, 5 parts by weight PEGDMA 550 and 0.05 wt % of CR173. The mixture was then processed as described in Example 1 above. The yellow index, the refractive index of the lens and the photochromic properties were measured as described above. The results are given in Table 1 below.

Example 6

BMOTDPS (50 parts by weight) was mixed with 10 parts by weight DVB, 40 parts by weight BA(4EO)DMA, and 0.05 wt % of CR173. The mixture was then processed as described in Example 1 above. The yellow index, the refractive index of the lens and the photochromic properties were measured as described above. The results are given in Table 1 below.

Example 7

BMOTDPS (63 parts by weight) was mixed with 10 parts by weight DVB, 27 parts by weight trimethylol propane ethoxylated (7/3 EO/OH), and 0.05 wt % of CR173. The mixture was then processed as described in Example 1 above. The yellow index, the refractive index of the lens and the photochromic properties were measured as described above. The results are given in Table 1 below.

Example 8

55 parts by weight BMOTDPS was mixed with 14 parts by weight STYR, 11 parts by weight DVB, 10 parts by weight trimethylol propane ethoxylated (7/3 EO/OH), 10 parts by weight TMOPTA, and 0.05 wt % CR173. The mixture was then processed as described in Example 1 above. The yellow index, the refractive index of the lens and the photochromic properties were measured as described above. The results are given in Table 1 below.

Comparative Example 1

Example 1 was followed except that 55 parts by weight TBBTDMA was used instead of BMOTDPS. The yellow index, the refractive index of the lens and the photochromic properties were measured as described above. The results are given in Table 1 below.

Comparative Example 2

Example 4 was followed except that 55 parts by weight TBBTDMA was used instead of BMOTDPS. Visual inspection of the cylinder showed neither striations nor optical distortion, but did reveal strong discoloration (brownish color).

Comparative Example 3

Example 1 was followed except that 55 parts by weight BA(4EO)DMA was used instead of BMOTDPS. The yellow index, the refractive index of the lens and the photochromic properties were measured as described above. The results are given in Table 1 below.

Comparative Example 4

Example 4 was followed except that 55 parts by weight of BA(4EO)DMA was used instead of BMOTDPS. Visual inspection of the cylinder showed neither striations nor optical distortion, and almost no discoloration.

Comparative Example 5

Photochromic properties of 2 mm thick SUN MAGIC™ 1.6 lenses (Rodenstock GmbH (Germany)) were evaluated for yellow index, refractive index and photochromic properties as described above. The results are given in Table 1 below.

Comparative Examples 6 and 7

Mixtures of MR-6 (a product of Mitsui-Toatsu Chemicals Co., Ltd., Japan) (Comparative Example 6), MR-7 (a product of Mitsui-Toatsu Chemicals Co., Ltd., Japan) (Comparative Example 7) and CR173 (at about 0.05 wt %) were made. The yellow index, the refractive index of the lens and the photochromic properties were measured as described above. The results are given in Table 1 below.

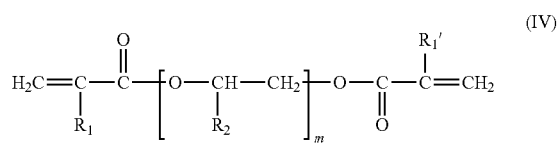

TABLE 1

| Sample | Yellow Index | T0 | TD15 | TF5 | TF60 | % recF5 | % recF60 | $n_d$ |
|---|---|---|---|---|---|---|---|---|
| Example 1 | 4.8 | 85.2 | 11.5. | 48.4 | 81.4 | 36.9 | 69.7 | 1.602 |
| Example 2 | 5.7 | 83.5 | 10.8 | 43.6 | 79.0 | 32.8 | 68.2 | 1.602 |
| Example 3 | 5.3 | 86.4 | 15.0 | 50.2 | 81.9 | 35.1 | 66.9 | 1.602 |
| Example 5 | 4.8 | 87.1 | 15.8 | 48.3 | 81.5 | 32.5 | 65.7 | 1.598 |
| Example 6 | 5.1 | 87.1 | 16.6 | 43.9 | 79.2 | 27.3 | 62.6 | 1.598 |
| Example 7 | 5.1 | 85.5 | 15.9 | 61.5 | 83.2 | 45.6 | 67.3 | 1.599 |
| Example 8 | 4.8 | 85.9 | 15.2 | 48.7 | 81 | 33.5 | 65.8 | 1.602 |
| Comparative Example 1 | 12.8 | 79.5 | 24.4 | 48.2 | 71.8 | 23.8 | 47.4 | 1.632 |
| Comparative Example 3 | 2.3 | 87.1 | 13.6 | 53 | 83 | 39.4 | 69.4 | 1.556 |
| Comparative Example 5 | 5.6 | 80.5 | 21.4 | 50.2 | 74.4 | 28.8 | 53 | ≈1.60 |
| Comparative Example 6 | 12.4 | 75.1 | 69.0 | 71.0 | 72.5 | 2 | 3.5 | 1.594 |
| Comparative Example 7 | 6.97 | 85.9 | 82.7 | 83.2 | 84.1 | 0.5 | 1.4 | 1.664 |

The implementations described above and other implementations are within the scope of the following claims. One skilled in the art will appreciate that the present disclosure can be practiced in embodiments other than those disclosed. The disclosed embodiments are presented for purposes of illustration and not limitation.

What is claimed is:
1. A composition comprising:
a. one or more compounds according to formula I

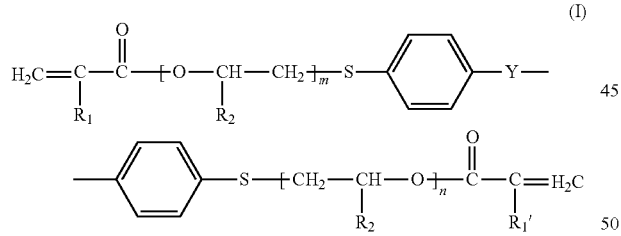

wherein
Y is —S—, or —SO$_2$—
R$_1$ and R$_1$' are independently chosen from H, —CH$_3$, or a combination thereof;
R$_2$ is H, —CH$_3$, or,

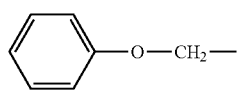

and
m and n are independently chosen from 0, 1, 2, 3, and 4;
b. one or more photochromic compounds; and
c. one or more compounds according to formula IV:

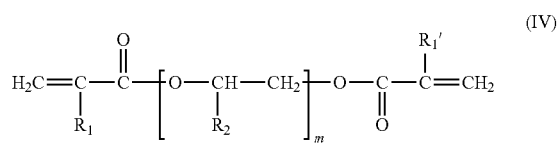

wherein R$_1$ and R$_1$' are independently chosen from H, —CH$_3$, or a combination thereof,
R$_2$ is H, —CH$_3$, and
m is an integer from 1 to 42.
2. The composition of claim 1, wherein m and n are independently chosen from 1 or 2.
3. The composition of claim 1, wherein the photochromic compound is chosen from spiroxazine compounds, spiropyran compounds, chromene compounds, fulgide compounds, fulgimide compounds, or combinations thereof.
4. The composition of claim 3, wherein the photochromic compound is a naphthopyran compound.
5. The composition of claim 1, wherein the photochromic compound includes at least one compound of formula II

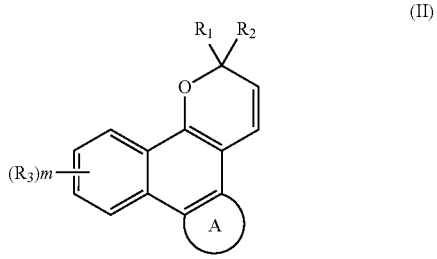

wherein
R$_1$ and R$_2$ are independently selected from
(a) H, (b) a linear or branched alkyl group which comprises 1 to 12 carbon atoms, (c) a cycloalkyl group which comprises 3 to 12 carbon atoms, (d) an aryl or heteroaryl group which comprises in its basic structure 6 to 24 carbon atoms or 4 to 24 carbon atoms respectively and at least one heteroatom selected from sulfur, oxygen and nitrogen; said basic structure being optionally substituted with at least one substituent selected from the substituents given below:

(i) a halogen, (ii) a hydroxy group, (iii) a linear or branched alkyl group which comprises 1 to 12 carbon atoms, (iv) a linear or branched alkoxy group which comprises 1 to 12 carbon atoms, (v) a haloalkyl or haloalkoxy group corresponding respectively to the ($C_1$-$C_{12}$) alkyl or alkoxy groups above which are substituted with at least one halogen atom, (vi) a phenoxy or naphthoxy group optionally substituted by at least one linear or branched alkyl or alkoxy group which comprises 1 to 6 carbon atoms, (vii) a linear or branched alkenyl group which comprises 2 to 12 carbon atoms, (viii) an —$NH_2$ group, (ix) an —NHR group, R representing a linear or branched alkyl group which comprises 1 to 6 carbon atoms, (x) a

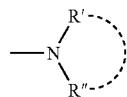

group, wherein R' and R", which are identical or different, independently representing a linear or branched alkyl group which comprises 1 to 6 carbon atoms, a phenyl group optionally substituted by at least one linear or branched alkyl or alkoxy group which comprises 1 to 6 carbon atoms, or representing together with the nitrogen atom to which they are bound a 5- to 7-membered ring which can comprise at least one other heteroatom selected from oxygen, sulfur and nitrogen, said nitrogen being optionally substituted with an R'" group, which is a linear or branched alkyl group comprising 1 to 6 carbon atoms, (xi) a methacryloyl group or an acryloyl group, or (e) an aralkyl or heteroaralkyl group, the alkyl group, which is linear or branched, comprising 1 to 4 carbon atoms, and the aryl and heteroaryl groups having the definitions given above, or (f) said two substituents $R_1$ and $R_2$ together form an adamantyl, norbornyl, fluorenylidene, di($C_1$-$C_6$)alkylanthracenylidene or spiro ($C_5$-$C_6$)cycloalkylanthracenylidene group; said group being optionally substituted with at least one of the substituents listed above for $R_1$, $R_2$ corresponding to an aryl or heteroaryl group;

$R_3$, which are identical or different, represent, independently (a) a halogen, (b) a linear or branched alkyl group which comprises 1 to 12 carbon atoms, (c) a cycloalkyl group which comprises 3 to 12 carbon atoms, (d) a linear or branched alkoxy group which comprises 1 to 12 carbon atoms, (e) a haloalkyl, halocycloalkyl, haloalkoxy group corresponding respectively to the alkyl, cycloalkyl, alkoxy groups above, which are substituted with at least one halogen atom, an aryl or heteroaryl group having the same definition as that given supra for $R_1$, $R_2$, (f) an aralkyl or heteroaralkyl group, the alkyl group, which is linear or branched, comprising 1 to 4 carbon atoms and the aryl and heteroaryl groups having the same definitions as those given supra for $R_1$, $R_2$, (g) a phenoxy or naphthoxy group optionally substituted by at least one linear or branched alkyl or alkoxy group which comprises 1 to 6 carbon atoms, (h) an amine or amide group: —$NH_2$, —NHR, —$CONH_2$, —CONHR,

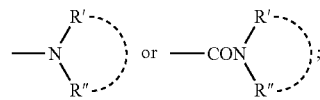

wherein R, R', R" have their respective definitions given supra for the amine substituents of the values $R_1$, $R_2$: aryl or heteroaryl, (i) an —O—$COR_8$ or —$COOR_8$ group, $R_8$ representing a straight or branched alkyl group comprising 1 to 6 carbon atoms or a cycloalkyl group comprising 3 to 6 carbon atoms or a phenyl group which is optionally substituted with at least one of the substituents listed above for the values of $R_1$, $R_2$: aryl or heteroaryl; or (j) at least two adjacent $R_3$ groups together form at least one aromatic or non-aromatic cyclic group having a single ring or two annelated rings, optionally comprising at least one heteroatom selected from the group comprising: oxygen, sulfur and nitrogen, this or these annelated rings being optionally substituted with at least one substituent selected from those having the definition given above for the aryl or heteroaryl groups which can form $R_1$ and/or $R_2$;

m is an integer of 0 to 4;

A represents:

 ($A_1$)

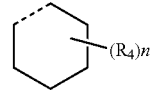 ($A_2$)

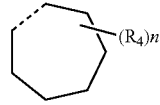 ($A_3$)

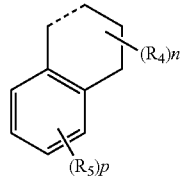 ($A_4$)

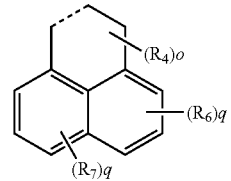 ($A_5$)

wherein (a) the dashed line represents the carbon $C_5$ carbon $C_6$ bond of the naphthopyran ring of formula (I);

(b) the α bond of the annelated ring ($A_4$) or ($A_5$) can be linked indifferently to carbon $C_5$ or to carbon $C_6$ of the naphthopyran ring of formula (I);

(c) $R_4$, which are identical or different, represent, independently, an OH, an alkyl or alkoxy group which is linear or branched and which comprises 1 to 6 carbon atoms or two of the $R_4$ form a carbonyl (CO);

(d) $R_5$, $R_6$ and $R_7$ represent, independently:

(i) a halogen, (ii) a linear or branched alkyl group which comprises 1 to 12 carbon atoms, (iii) a haloalkyl group corresponding to the linear or branched above alkyl group, which is substituted with at least one halogen atom, a cycloalkyl group which comprises 3 to 12 carbon atoms, (iv) a linear or branched alkoxy group which comprises 1 to 6 carbon atoms, (v) a phenyl or benzyl group, optionally substituted with at least one of the substituents listed above in the definitions of the radicals $R_1$, $R_2$ of formula (II) in the case in which the radicals independently correspond to an aryl or heteroaryl group, (vi) a —$NH_2$, —NHR, or

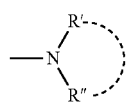

amino group,

Wherein R, R', R" have their respective definitions given supra for the amine substituents of the values $R_1$, $R_2$: aryl or heteroaryl, (vii) a phenoxy or naphthoxy group optionally substituted by at least one linear or branched alkyl or alkoxy group which comprises 1 to 6 carbon atoms, (viii) a—$COR_9$, —$COOR_9$ or —$CONHR_9$ group, $R_9$ representing a linear or branched alkyl group comprising 1 to 6 carbon atoms or a cycloalkyl group comprising 3 to 6 carbon atoms or a phenyl or benzyl group which is optionally substituted with at least one of the substituents listed above in the definitions of the radicals $R_1$, $R_2$ of formula (II) in the case in which the radicals independently correspond to an aryl or heteroaryl group, or (ix) it being possible for two adjacent $R_5$ groups to together form a 5- to 6-membered aromatic or non-aromatic ring which can comprise at least one heteroatom selected from the group comprising: oxygen, sulfur and nitrogen;

(e) n is an integer of 0 to 6;

(f) o is an integer of 0 to 2;

(g) p is an integer of 0 to 4; and (h) q is an integer of 0 to 3;

with the condition according to which in ($A_1$) and ($A_2$) n is zero only in the case in which at least two of the adjacent $R_3$ substituents form at least one aromatic or non-aromatic cyclic group having a single ring or two annelated rings, optionally comprising at least one heteroatom selected from the group comprising: oxygen, sulfur and nitrogen, this or these annelated rings being optionally substituted with at least one substituent selected from those having the definition given above for the aryl groups which can form $R_1$ and/or $R_2$.

6. The composition of claim 1 having at least about 30% by weight of at least one compound of formula I.

7. The composition of claim 1 further comprising one or more compound according to formula III:

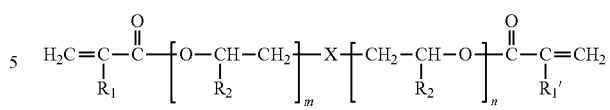

wherein X is selected from:

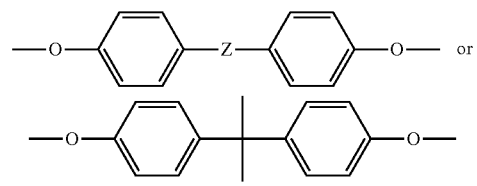

wherein Z is selected from —$SO_2$—, —SO—, —S—, —$C(CH_3)_2$—, —$(CH_2)_a$— wherein a is 1, 2, 3, or 4;

$R_1$ and $R_1$ are independently chosen from H, —$CH_3$, or a combination thereof; and $R_2$ is H, —$CH_3$; and m and n are integers and are independently selected such that (m+n)=2 to 30.

8. The composition of claim 1 further comprising one or more compounds according to formula V:

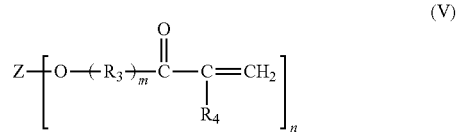

wherein $R_3$ is —$CH_2CH(CH_3)O$— or —$CH_2CH_2O$—;

$R_4$ is H, or $CH_3$;

Z is a monovalent, or polyvalent radical of a polyol;

m is 0 or 1; and n is an integer from 1 to 6.

9. The composition of claim 1 further comprising one or more compounds according to formula VI:

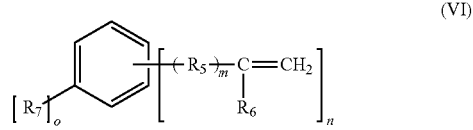

wherein $R_7$ is H, $CH_3$, or —$SCH_3$ $R_6$ is —$CH_3$ or H;

$R_5$ is —$CH_2OC(=O)$—, or —$CH_2SC(=O)$—;

m is 0 or 1;

n is 1 or 2; and o is 0, 1, or 2.

10. The composition of claim 1, wherein the compound of formula I is 4,4'-bis(methacryloyloxyethylthio)diphenylsulfone and the photochromic compound is a naphthopyran compound.

11. The composition of claim 10 further comprising divinylbenzene, styrene, and trimethylolylpropane trimethacrylate.

12. A resin obtained by polymerization of a composition comprising:

a. one or more compounds according to formula I

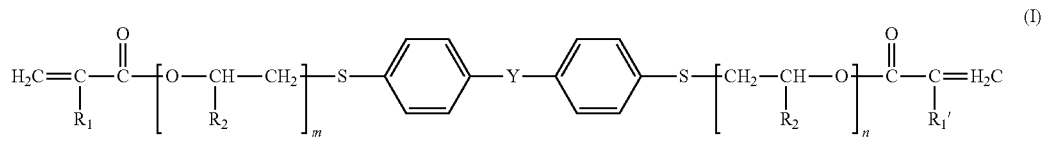

wherein
Y is —S—, or —SO$_2$—
R$_1$ and R$_1$' are independently chosen from H, —CH$_3$, or a combination thereof;
R$_2$ is H, —CH$_3$, or,

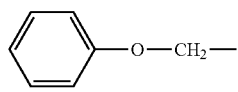

and
m and n are independently chosen from 0, 1, 2, 3, and 4;
b. one or more photochromic compounds; and
c. one or more compounds according to formula IV:

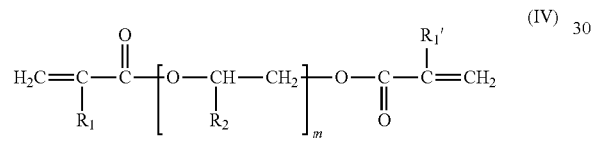

wherein R$_1$ and R$_1$' are independently chosen from H, —CH$_3$, a combination thereof,
R$_2$ is H, —CH$_3$, and
m is an integer from 1 to 42.

13. The resin of claim 12, wherein the composition comprises at least about 30% by weight of at least one compound of formula I.

14. The resin of claim 12, wherein the composition further comprises one or more compound according to formula III:

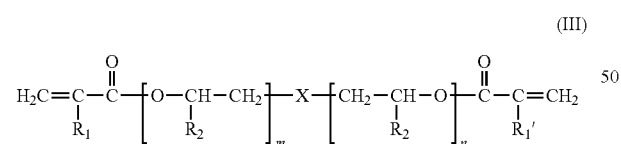

wherein X is selected from:

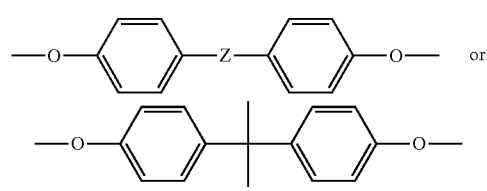

wherein Z is selected from —SO$_2$—, —SO—, —S—, —C(CH$_3$)$_2$—, —(CH$_2$)$_a$— wherein a is 1, 2, 3, or 4;

R$_1$ and R$_1$ are independently chosen from H, —CH$_3$, or a combination thereof; and
R$_2$ is H, —CH$_3$; and
m and n are integers and are independently selected such that (m+n)=2 to 30.

15. The resin of claim 12, wherein the composition further comprises one or more compounds according to formula V:

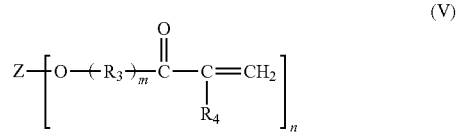

wherein R$_3$ is —CH$_2$CH(CH$_3$)O— or —CH$_2$CH$_2$O—;
R$_4$ is H, or CH$_3$;
Z is a monovalent, or polyvalent radical of a polyol;
m is 0 or 1; and
n is an integer from 1 to 6.

16. The resin of claim 12, wherein the composition further comprises one or more compounds according to formula VI:

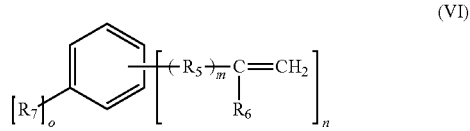

wherein R$_7$ is H, CH$_3$, or —SCH$_3$
R$_6$ is —CH$_3$ or H;
R$_5$ is —CH$_2$OC(=O)—, or —CH$_2$SC(=O)—;
m is 0 or 1;
n is 1 or 2; and
o is 0, 1, or 2.

17. An article comprising a resin obtained by polymerization of a composition comprising:

a. one or more compounds according to formula I:

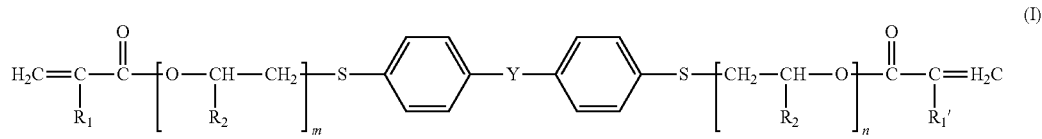

wherein
Y is —S—, or —SO$_2$—;
R$_1$ and R$_1$' are independently chosen from H, —CH$_3$, or a combination thereof;
R$_2$ is H, —CH$_3$, or,

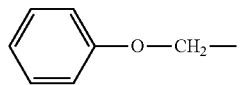

and
m and n are independently chosen from 0, 1, 2, 3, and 4;
b. one or more photochromic compounds; and
c. one or more compounds according to formula IV:

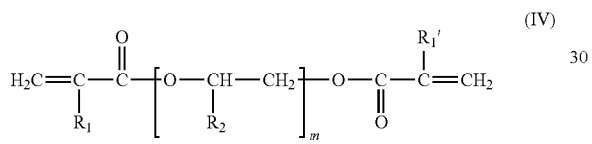

wherein R$_1$ and R$_1$' are independently chosen from H, —CH$_3$, or a combination thereof,
R$_2$ is H, —CH$_3$, and
m is an integer from 1 to 42,
wherein the article is an ophthalmic article and wherein it has a refractive index of between about 1.59 and 1.61.

18. The article of claim 17 further comprising divinylbenzene, styrene, and trimethylolylpropane trimethacrylate.

19. A composition comprising:
a. one or more compounds according to formula I

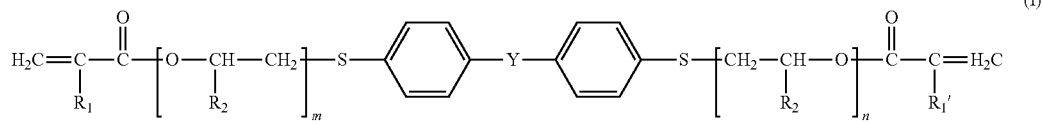

wherein
Y is —S—, or —SO$_2$—
R$_1$ and R$_1$' are independently chosen from H, —CH$_3$, or a combination thereof;
R$_2$ is H, —CH$_3$, or,

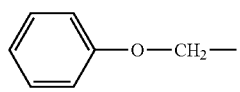

and
m and n are independently chosen from 0, 1, 2, 3, and 4;

b. one or more photochromic compounds; and
c. one or more compounds according to formula V:

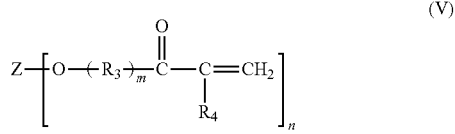

wherein R$_3$ is —CH$_2$CH(CH$_3$)O— or —CH$_2$CH$_2$O—;
R$_4$ is H, or CH$_3$;
Z is a monovalent, or polyvalent radical of a polyol;
m is 0 or 1; and
n is an integer from 1 to 6.

20. The composition of claim 19, wherein m and n are independently chosen from 1 or 2.

21. The composition of claim 19, wherein the photochromic compound is chosen from spiroxazine compounds, spiropyran compounds, chromene compounds, fulgide compounds, fulgimide compounds, or combinations thereof.

22. The composition of claim 21, wherein the photochromic compound is a naphthopyran compound.

23. The composition of claim 1, wherein the photochromic compound includes at least one compound of formula II

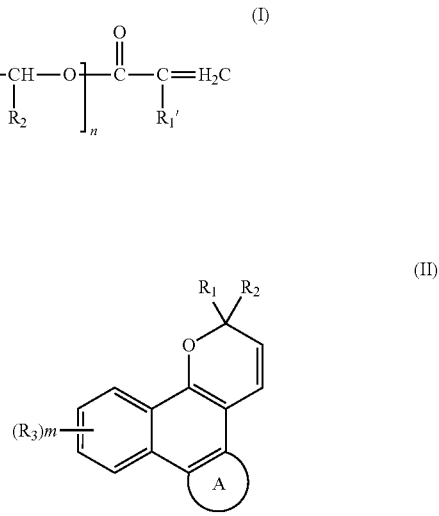

wherein $R_1$ and $R_2$ are independently selected from
  (a) H, (b) a linear or branched alkyl group which comprises 1 to 12 carbon atoms, (c) a cycloalkyl group which comprises 3 to 12 carbon atoms, (d) an aryl or heteroaryl group which comprises in its basic structure 6 to 24 carbon atoms or 4 to 24 carbon atoms respectively and at least one heteroatom selected from sulfur, oxygen and nitrogen; said basic structure being optionally substituted with at least one substituent selected from the substituents given below:
    (i) a halogen, (ii) a hydroxy group, (iii) a linear or branched alkyl group which comprises 1 to 12 carbon atoms, (iv) a linear or branched alkoxy group which comprises 1 to 12 carbon atoms, (v) a haloalkyl or haloalkoxy group corresponding respectively to the ($C_1$-$C_{12}$) alkyl or alkoxy groups above which are substituted with at least one halogen atom, (vi) a phenoxy or naphthoxy group optionally substituted by at least one linear or branched alkyl or alkoxy group which comprises 1 to 6 carbon atoms, (vii) a linear or branched alkenyl group which comprises 2 to 12 carbon atoms, (viii) an —$NH_2$ group, (ix) an —NHR group, R representing a linear or branched alkyl group which comprises 1 to 6 carbon atoms, (x) a

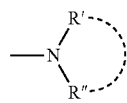

group, wherein R' and R", which are identical or different, independently representing a linear or branched alkyl group which comprises 1 to 6 carbon atoms, a phenyl group optionally substituted by at least one linear or branched alkyl or alkoxy group which comprises 1 to 6 carbon atoms, or representing together with the nitrogen atom to which they are bound a 5- to 7-membered ring which can comprise at least one other heteroatom selected from oxygen, sulfur and nitrogen, said nitrogen being optionally substituted with an R''' group, which is a linear or branched alkyl group comprising 1 to 6 carbon atoms, (xi) a methacryloyl group or an acryloyl group, or
  (e) an aralkyl or heteroaralkyl group, the alkyl group, which is linear or branched, comprising 1 to 4 carbon atoms, and the aryl and heteroaryl groups having the definitions given above, or (f) said two substituents $R_1$ and $R_2$ together form an adamantyl, norbornyl, fluorenylidene, di($C_1$-$C_6$)alkylanthracenylidene or spiro ($C_5$-$C_6$)cycloalkylanthracenylidene group; said group being optionally substituted with at least one of the substituents listed above for $R_1$, $R_2$ corresponding to an aryl or heteroaryl group;

$R_3$, which are identical or different, represent, independently
  (a) a halogen, (b) a linear or branched alkyl group which comprises 1 to 12 carbon atoms, (c) a cycloalkyl group which comprises 3 to 12 carbon atoms, (d) a linear or branched alkoxy group which comprises 1 to 12 carbon atoms, (e) a haloalkyl, halocycloalkyl, haloalkoxy group corresponding respectively to the alkyl, cycloalkyl, alkoxy groups above, which are substituted with at least one halogen atom, an aryl or heteroaryl group having the same definition as that given supra for $R_1$, $R_2$, (f) an aralkyl or heteroaralkyl group, the alkyl group, which is linear or branched, comprising 1 to 4 carbon atoms and the aryl and heteroaryl groups having the same definitions as those given supra for $R_1$, $R_2$, (g) a phenoxy or naphthoxy group optionally substituted by at least one linear or branched alkyl or alkoxy group which comprises 1 to 6 carbon atoms, (h) an amine or amide group: —$NH_2$, —NHR, —$CONH_2$, —CONHR,

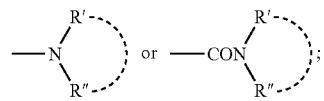

wherein R, R', R" have their respective definitions given supra for the amine substituents of the values $R_1$, $R_2$: aryl or heteroaryl, (i) an —O—$COR_8$ or —$COOR_8$ group, $R_8$ representing a straight or branched alkyl group comprising 1 to 6 carbon atoms or a cycloalkyl group comprising 3 to 6 carbon atoms or a phenyl group which is optionally substituted with at least one of the substituents listed above for the values of $R_1$, $R_2$: aryl or heteroaryl; or (j) at least two adjacent $R_3$ groups together form at least one aromatic or non-aromatic cyclic group having a single ring or two annelated rings, optionally comprising at least one heteroatom selected from the group comprising: oxygen, sulfur and nitrogen, this or these annelated rings being optionally substituted with at least one substituent selected from those having the definition given above for the aryl or heteroaryl groups which can form $R_1$ and/or $R_2$;

m is an integer of 0 to 4;

A represents:

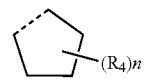

(A$_1$)

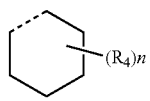

(A$_2$)

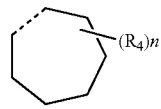

(A$_3$)

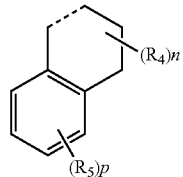

(A$_4$)

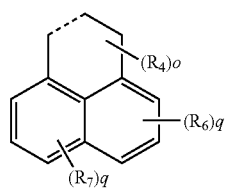

(A5)

wherein
(a) the dashed line represents the carbon $C_5$ carbon $C_6$ bond of the naphthopyran ring of formula (I);
(b) the α bond of the annelated ring ($A_4$) or ($A_5$) can be linked indifferently to carbon $C_5$ or to carbon $C_6$ of the naphthopyran ring of formula (I);
(c) $R_4$, which are identical or different, represent, independently, an OH, an alkyl or alkoxy group which is linear or branched and which comprises 1 to 6 carbon atoms or two of the $R_4$ form a carbonyl (CO);
(d) $R_5$, $R_6$ and $R_7$ represent, independently:
  (i) a halogen, (ii) a linear or branched alkyl group which comprises 1 to 12 carbon atoms, (iii) a haloalkyl group corresponding to the linear or branched above alkyl group, which is substituted with at least one halogen atom, a cycloalkyl group which comprises 3 to 12 carbon atoms, (iv) a linear or branched alkoxy group which comprises 1 to 6 carbon atoms, (v) a phenyl or benzyl group, optionally substituted with at least one of the substituents listed above in the definitions of the radicals $R_1$, $R_2$ of formula (II) in the case in which the radicals independently correspond to an aryl or heteroaryl group, (vi) a —$NH_2$, —NHR, or

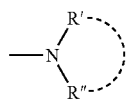

amino group,
Wherein R, R', R" have their respective definitions given supra for the amine substituents of the values $R_1$, $R_2$: aryl or heteroaryl, (vii) a phenoxy or naphthoxy group optionally substituted by at least one linear or branched alkyl or alkoxy group which comprises 1 to 6 carbon atoms, (viii) a —$COR_9$, —$COOR_9$ or —$CONHR_9$ group, $R_9$ representing a linear or branched alkyl group comprising 1 to 6 carbon atoms or a cycloalkyl group comprising 3 to 6 carbon atoms or a phenyl or benzyl group which is optionally substituted with at least one of the substituents listed above in the definitions of the radicals $R_1$, $R_2$ of formula (II) in the case in which the radicals independently correspond to an aryl or heteroaryl group, or (ix) it being possible for two adjacent $R_5$ groups to together form a 5- to 6-membered aromatic or non-aromatic ring which can comprise at least one heteroatom selected from the group comprising: oxygen, sulfur and nitrogen;
(e) n is an integer of 0 to 6;
(f) o is an integer of 0 to 2;
(g) p is an integer of 0 to 4; and
(h) q is an integer of 0 to 3;

with the condition according to which in ($A_1$) and ($A_2$) n is zero only in the case in which at least two of the adjacent $R_3$ substituents form at least one aromatic or non-aromatic cyclic group having a single ring or two annelated rings, optionally comprising at least one heteroatom selected from the group comprising: oxygen, sulfur and nitrogen, this or these annelated rings being optionally substituted with at least one substituent selected from those having the definition given above for the aryl groups which can form $R_1$ and/or $R_2$.

24. The composition of claim 1 having at least about 30% by weight of at least one compound of formula I.

25. The composition of claim 1 further comprising one or more compound according to formula III:

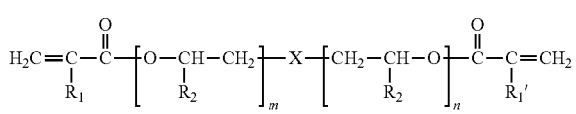

(III)

wherein X is selected from:

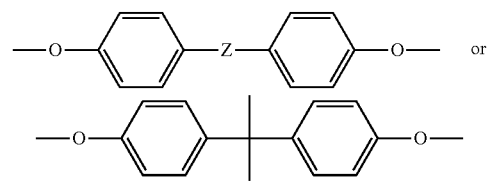

wherein Z is selected from —$SO_2$—, —SO—, —S—, —$C(CH_3)_2$—, —$(CH_2)_a$— wherein a is 1, 2, 3, or 4;
$R_1$ and $R_1$ are independently chosen from H, —$CH_3$, or a combination thereof; and
$R_2$ is H, —$CH_3$; and
m and n are integers and are independently selected such that (m+n)=2 to 30.

26. The composition of claim 19 further comprising one or more compounds according to formula VI:

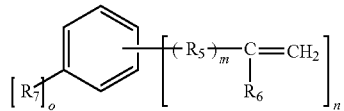

(VI)

wherein $R_7$ is H, $CH_3$, or —$SCH_3$
$R_6$ is —$CH_3$ or H;
$R_5$ is —$CH_2C(=O)$—, or —$CH_2SC(=O)$—;
m is 0 or 1;
n is 1 or 2; and
o is 0, 1, or 2.

27. The composition of claim 19, wherein the compound of formula I is 4,4'-bis(methacryloyloxyethylthio)diphenylsulfone and the photochromic compound is a naphthopyran compound.

28. The composition of claim 27 further comprising divinylbenzene, styrene, and polyethyleneglycol dimethacrylate.

29. A resin obtained by polymerization of a composition comprising:

a. one or more compounds according to formula I

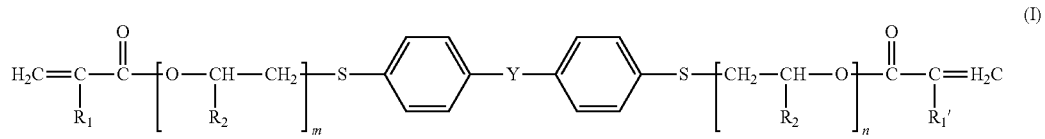

wherein
Y is —S—, or —SO$_2$—
R$_1$ and R$_1$' are independently chosen from H, —CH$_3$, or a combination thereof;
R$_2$ is H, —CH$_3$, or,

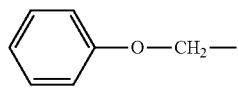

and
m and n are independently chosen from 0, 1, 2, 3, and 4;
b. one or more photochromic compounds; and
c. one or more compounds according to formula V:

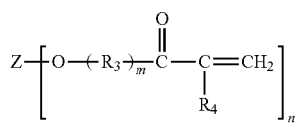

wherein R$_3$ is —CH$_2$CH(CH$_3$)O— or —CH$_2$CH$_2$O—;
R$_4$ is H, or CH$_3$;
Z is a monovalent, or polyvalent radical of a polyol;
m is 0 or 1; and
n is an integer from 1 to 6.

30. The resin of claim 29, wherein the composition comprises at least about 30% by weight of at least one compound of formula I.

31. The resin of claim 29, wherein the composition further comprises one or more compound according to formula III:

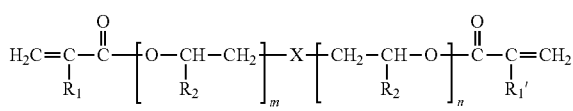

wherein X is selected from:

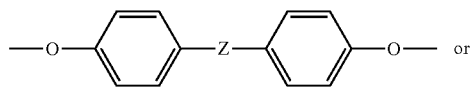

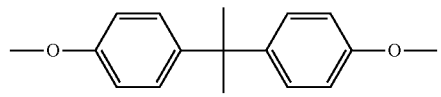

wherein Z is selected from —SO$_2$—, —SO—, —S—, —C(CH$_3$)$_2$—, —(CH$_2$)$_a$— wherein a is 1, 2, 3, or 4;
R$_1$ and R$_1$ are independently chosen from H, —CH$_3$, or a combination thereof; and
R$_2$ is H, —CH$_3$; and
m and n are integers and are independently selected such that (m+n)=2 to 30.

32. The resin of claim 29, wherein the composition further comprises one or more compounds according to formula VI:

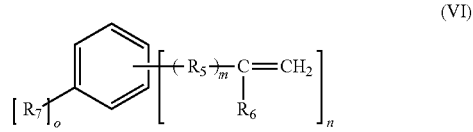

wherein R$_7$ is H, CH$_3$, or —SCH$_3$
R$_6$ is —CH$_3$ or H;
R$_5$ is —CH$_2$C(=O)—, or —CH$_2$SC(=O)—;
m is 0 or 1;
n is 1 or 2; and
o is 0, 1, or 2.

33. An article comprising a resin obtained by polymerization of a composition comprising:
a. one or more compounds according to formula I:

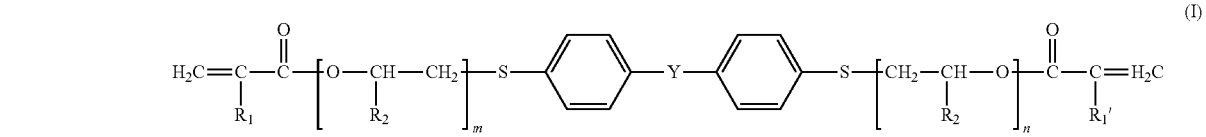

wherein

Y is —S—, or —SO$_2$—;

R$_1$ and R$_1$' are independently chosen from H, —CH$_3$, or a combination thereof;

R$_2$ is H, —CH$_3$, or,

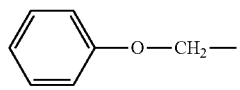

and m and n are independently chosen from 0, 1, 2, 3, and 4;

b. one or more photochromic compounds; and c. one or more compounds according to formula V:

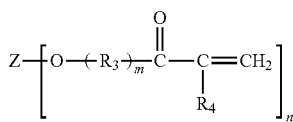

(V)

wherein R$_3$ is —CH$_2$CH(CH$_3$)O— or —CH$_2$CH$_2$O—;

R$_4$ is H, or CH$_3$;

Z is a monovalent, or polyvalent radical of a polyol;

m is 0 or 1; and n is an integer from 1 to 6, wherein the article is an ophthalmic article and wherein it has a refractive index of between about 1.59 and 1.61.

34. The article of claim 33 further comprising divinylbenzene, styrene, and polyethyleneglycol dimethacrylate.

* * * * *